United States Patent
Odland et al.

(10) Patent No.: US 7,518,325 B2
(45) Date of Patent: Apr. 14, 2009

(54) SYSTEM AND METHOD FOR CONTROLLING ANTI-PINCH POWERED WINDOWS

(75) Inventors: Michael Keith Odland, Austin, TX (US); Douglas Piasecki, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 11/537,420

(22) Filed: Sep. 29, 2006

(65) Prior Publication Data

US 2008/0079379 A1   Apr. 3, 2008

(51) Int. Cl.
   *H02P 1/00*   (2006.01)
(52) U.S. Cl. .................. 318/280; 318/466; 318/469
(58) Field of Classification Search .................. 318/469, 318/461, 466, 280, 430, 685
   See application file for complete search history.

(56) References Cited

U.S. PATENT DOCUMENTS

| | | | | |
|---|---|---|---|---|
| 5,483,135 A | * | 1/1996 | Parks | 318/469 |
| 5,497,322 A | * | 3/1996 | Kolomyski et al. | 701/29 |
| 5,539,290 A | * | 7/1996 | Lu et al. | 318/565 |
| 5,596,253 A | * | 1/1997 | Mizuta et al. | 318/469 |
| 6,150,784 A | * | 11/2000 | Nagaoka | 318/467 |
| 6,253,135 B1 | * | 6/2001 | Hubacher | 701/49 |
| 6,404,158 B1 | * | 6/2002 | Boisvert et al. | 318/469 |
| 6,456,027 B1 | * | 9/2002 | Pruessel | 318/445 |
| 6,822,410 B2 | * | 11/2004 | Whinnery et al. | 318/469 |
| 6,906,487 B2 | * | 6/2005 | de Frutos | 318/468 |
| 7,021,001 B1 | * | 4/2006 | Schooler | 49/28 |

FOREIGN PATENT DOCUMENTS

GB   2199963 A   *   5/1987

* cited by examiner

*Primary Examiner*—Walter Benson
*Assistant Examiner*—Antony M Paul
(74) *Attorney, Agent, or Firm*—Howison & Arnott, L.L.P.

(57) ABSTRACT

A system and method for an anti-pinch powered window system includes a window and a mechanical drive mechanism for raising and lowering the window. An electric motor drives the mechanical drive mechanism responsive to a command. A microcontroller unit generates the command responsive to a measured load current of the electric motor. A command to change direction of the window is generated responsive to a determination that the measured load current has exceeded a variable threshold level indicating that the window has stopped due to an obstruction. The variable threshold level is determined by the load current data stored within a memory.

17 Claims, 5 Drawing Sheets

SYSTEM AND METHOD FOR CONTROLLING ANTI-PINCH POWERED WINDOWS

TECHNICAL FIELD OF THE INVENTION

The present invention relates to anti-pinch control of powered windows for vehicles, and more particularly, to a method for varying the threshold level from which a pinch is determined for a powered window.

BACKGROUND OF THE INVENTION

Many vehicles have powered window systems. Such systems provide for the power driven opening and closing of vehicle windows in response to the activation of a switch. During normal operation, a window is closed by the activation of the switch. When the switch is activated, the window travels to a fully closed position. However, on occasion, an obstruction is encountered by the window during the close or open cycle. The obstruction may be part of the human body. Occasionally, a power window activation switch is accidentally activated by a child when the child has his head, neck or arms within the window opening. If an obstruction is met by the window while the window is being closed or opened, movement of the window should be immediately stopped and reversed.

A power sunroof is a version of a power window. A power sunroof system opens and closes an opening within the roof of a vehicle. If an obstruction is met by the sunroof while the sunroof is being closed or opened, movement of the sunroof should be immediately stopped and reversed.

Presently, the control of when to stop the movement of a window is made by monitoring the load current applied to the electric motor that is opening and closing the powered window or sunroof. By comparing the current load level to a particular threshold level, a determination of whether to reverse the window closing may be made. However, over time various environmental, dynamic and mechanical conditions may affect the normal operation level associated with the opening and closing of a window. Some manner for determining and tracking these conditions and the threshold level, enables better determination of their effect on when to cease the movement of a window and reverse it would be greatly beneficial.

SUMMARY OF THE INVENTION

The present invention, as disclosed and described herein, comprises an anti-pinch powered window system. A window is raised and lowered by a mechanical drive mechanism. An electric motor drives the mechanical drive mechanism responsive to a command. A microcontroller unit generates the command responsive to a measured load current of the electric motor. A command to change a direction of the window is generated by the microcontroller responsive to a determination that the load current measured by the microcontroller has exceeded a variable threshold level. This variable threshold level indicates that the window has caught upon some obstruction. The variable threshold level is determined by the microcontroller unit from stored load current data. The load current data is stored within a memory associated with the microcontroller unit.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
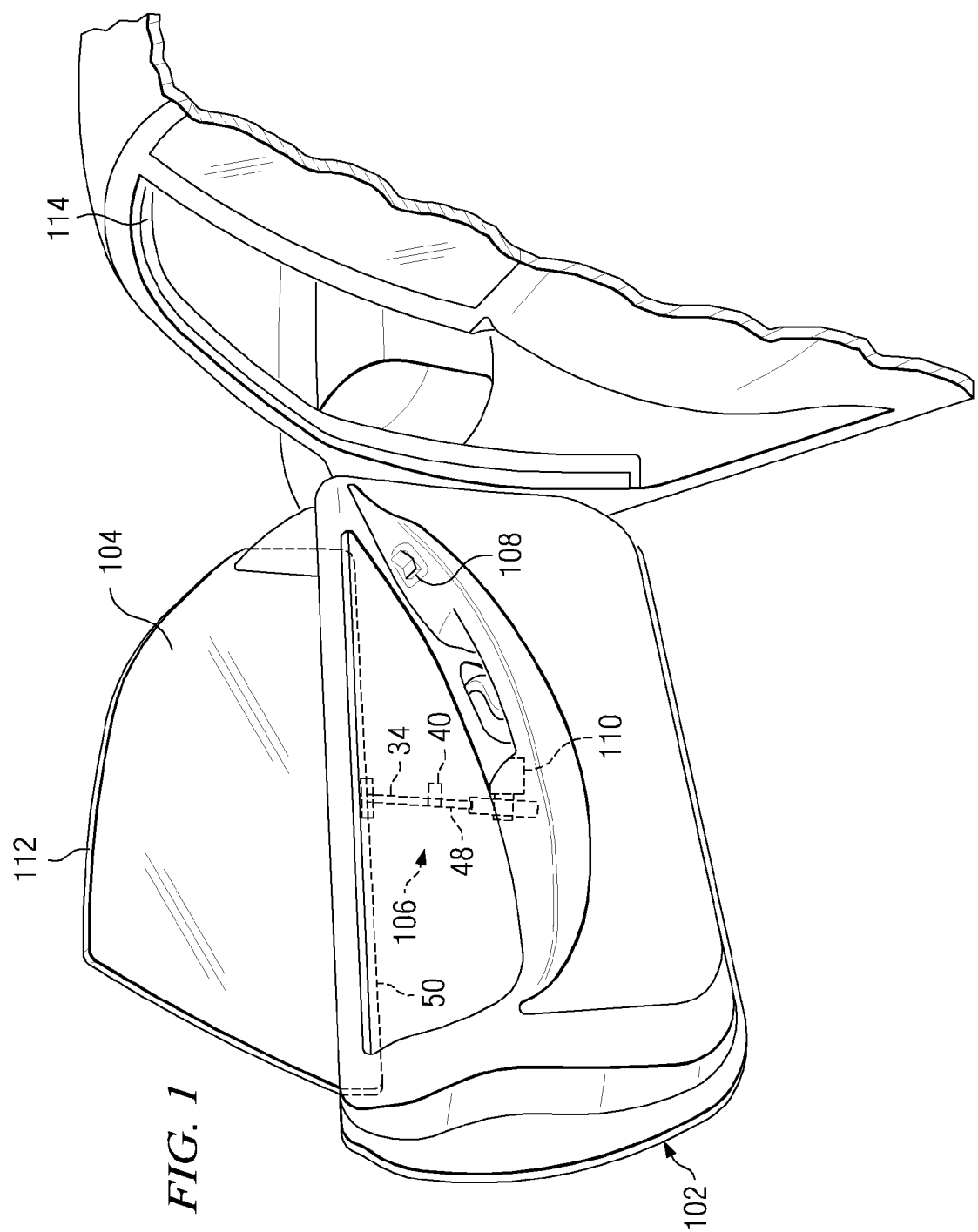
FIG. 1 illustrates a powered window assembly in the door of an automobile.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now more particularly to FIG. 1, there is illustrated an anti-pinch system for use with a power window of an automobile. The powered window assembly is located within a door 102 of the automobile. The window 104 is connected to the door 102 and opens and closes responsive to a powered drive mechanism 106. The powered drive mechanism 106 is activated by a switch 108 located upon the door 102. A powered door assembly control circuit 110 controls the operation for opening and closing the window 104 responsive to input from the switch 108. Additionally, the powered door assembly control circuit 110 provides the anti-pinch control to prevent someone or something from being caught between the upper edge 112 of the window 104 and the door frame 114 of the automobile.

Figure 2:
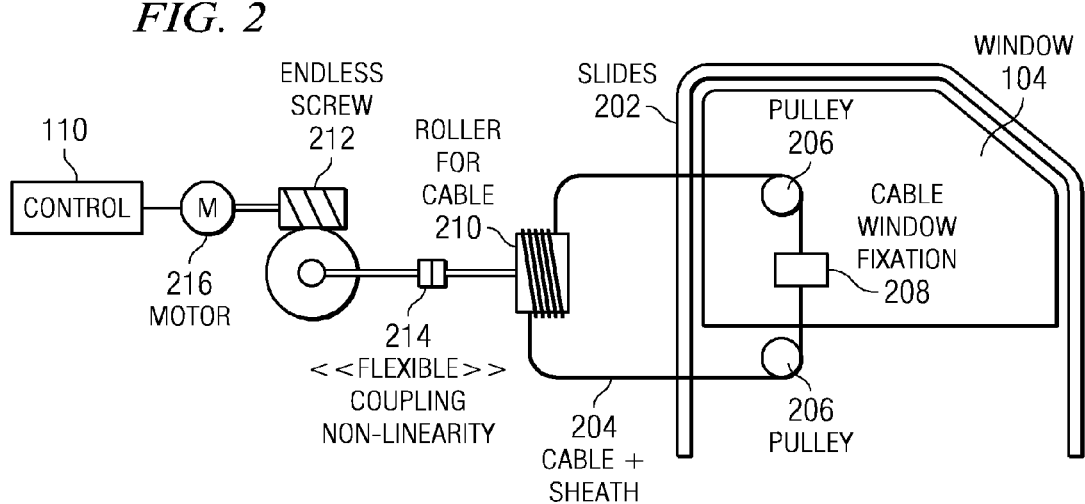
FIG. 2 is a functional illustration of a powered window assembly.

Referring now to FIG. 2, there is more particularly illustrate the powered window mechanism 106 and its associated control circuitry 110 for a particular window 104. As can be seen, the window 104 is positioned within various track slides 202 within the door frame of the automobile. A cable assembly consisting of a cable 204 and pulleys 206 are connected to the window 104 via some type of connection 208. A roller 210 rotates in a clockwise or counter-clockwise direction to both open and close the window by rolling cable onto or letting cable extend from the roller 210. An endless screw assembly 212 is connected to the roller 210 via some type of connector 214. The endless screw assembly 210 is driven by an electrical motor 216 that is under the control of the control circuitry 110. While the cable assembly illustrated with respect to FIG. 2 is one type of mechanical configuration for the powered assembly for opening and closing a window of an automobile, it will be realized by one skilled in the art that various different configurations for mechanically opening and closing the window may be utilized.

Figure 3:
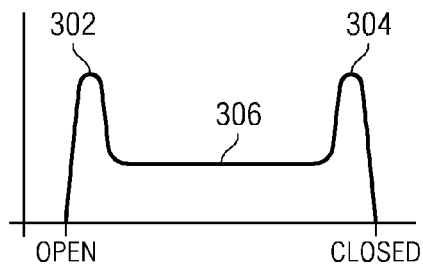
FIG. 3 illustrates the normal load current for a powered window assembly.

In present day configurations for anti-pinch control of the powered window assemblies, the control circuitry 110 will monitor the load current of the electrical motor 216 in order to determine when a obstruction condition occurs. FIG. 3 represents the load current for the electric motor 216 during the opening and closing of a window. A maximum current level is achieved at 302 when the powered window mechanism begins to move the window from the opened position towards the closed position. This is due to the increased current necessary to initiate movement of the window from a stopped position. A second maximum current level is achieved at 304 when the window has been completely closed. This arises from the point at which the top edge of the window engages the top edge of the door frame and the electric motor continues to try to drive the window upward while the door frame prevents the window from further movement. This temporarily increases the current level until this maximum threshold is detected and the closing of the window is ceased. Between the maximum level 302 caused by the opening of the window and the maximum level 304 caused by the closing of the window, the electric motor drive current will level out to a normal operation along line 306. This represents the normal current load level necessary for driving the window once it has begun movement and before it has been stopped by the door frame.

Figure 4:
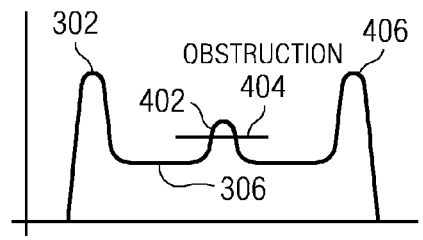
FIG. 4 illustrates the load current for a powered window assembly when encountering an obstruction.

Referring now to FIG. 4, there is illustrated the load current of the electric motor when some item such as a stick or a child's head or finger has become wedged between the upper edge of the window and the door frame. In this case, a second peak 402 in the load current is detected responsive to the additional load required by the motor in order to try to force its way past the item that is jamming the window and preventing it from closing. Anti-pinch powered window assemblies have a threshold level 404 which when detected caused the window to stop and reverse direction in order to allow the obstruction to be cleared from the window. This level 404 would be detected at a point different from the point one would expect to see this level as the window closed. As before, the normal operating level 306 is maintained while the window is opening or closing in a non-obstructed manner. A further peak 406 can be observed when the window completes its reopening to remove the obstruction responsive to the motor attempting to drive the window when it will open no further.

Figure 5:
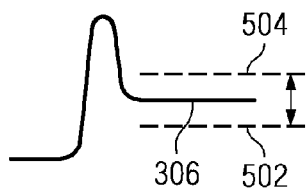
FIG. 5 illustrates the manner in which the load current normal operating level may vary with respect to various environmental and mechanical conditions.

Referring now to FIG. 5, there is illustrated the manner in which the constant normal operation level 306 of the powered window assembly may vary from a low level 502 to a high level 504 based upon a variety of environmental, dynamic and mechanical conditions associated with the window 104 and the electric motor 216 which is driving the window. For example, the normal operation level 306 may raise or lower based upon the outside air temperature, whether or not the window is dirty, the age of the electric motor driving the window assembly, the outside air humidity, the speed at which the window is driven and a variety of other conditions which will cause the level to vary between levels 502 and 504 over the lifetime of the powered window assembly. Dynamic conditions affecting the window would include road conditions or velocity of the vehicle, which can change the threshold. Under these circumstances, it is necessary to know what the offset that stops the window from closing or opening from the normal operation level 306 is with respect to the window drive assembly at any particular time. A determination of the offset is necessary to determine when to trigger the anti-pinch functionalities causing the window to reverse direction must be accurately determined. If the normal operation level 306 is higher than normal, monitoring of the motor drive current could cause the window to be unable to be raised if the normal operation level 306 had risen to a level equal to or greater than the offset threshold which initiates the anti-pinch operation. Likewise, if the normal operation level 306 had dropped to lower than the normal level toward level 502, the window would be required to push upon an item which was blocking its moving for a greater period of time than would be desirable in order for the motor current level to reach the established threshold level.

Figure 6:
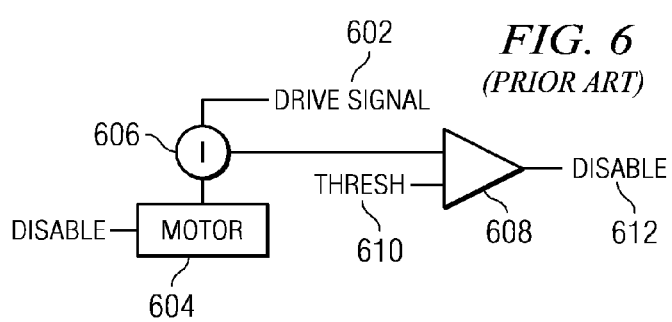
FIG. 6 illustrates a prior art method for providing anti-pinch control to a powered window assembly.

Referring now to FIG. 6, there is illustrated the control circuitry associated with a previous method for implementing anti-pinch circuitry within a powered window assembly. A drive signal 602 is provided to an electric motor assembly 604. This drive signal 602 creates a load current 606 which varies depending upon the difficulty the motor has in driving the window. The drive current 606 in addition to driving the motor 604 is provided to a first input of a comparator 608. The other input of the comparator 608 is connected to a threshold level 610 which is the load current level at which it is desired to generate a disable signal 612 that causes the window to reverse direction. Thus, when the load current 606 exceeds the threshold level 610 the output of the comparator 608 generates the disable signal 612. The disable signal 612 is applied back to the electric motor 604 to reverse its operation and cause the window to open rather than close or vice versa. The problems with the circuit described with respect to FIG. 6 include those discussed previously with respect to FIG. 5 and the varying normal operation level 306 provided when the window is opening or closing.

Figure 7:
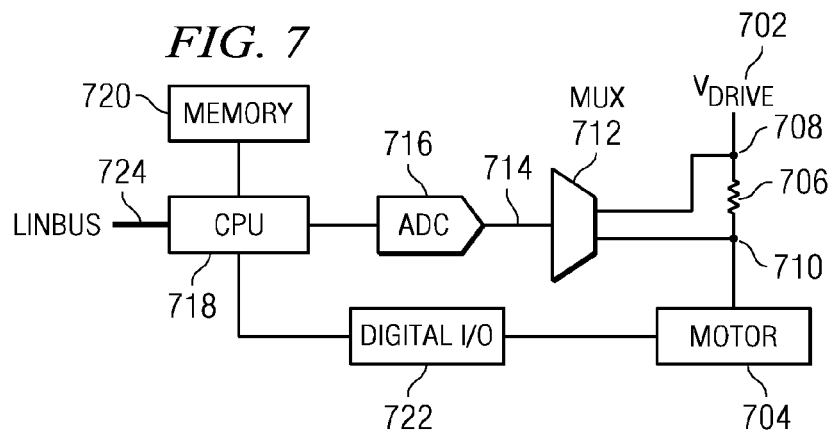
FIG. 7 illustrates the present system for providing a anti-pinch control to a powered window assembly.

Referring now to FIG. 7, there is illustrated one embodiment for providing anti-pinch control to a powered window assembly using a microprocessor control circuit 800 that can dynamically adjust to changes in the normal operation level 306 occurring while the window is moving. A voltage drive signal 702 is applied to an electric motor 704 through a load resistor 706. A voltage level of the input drive signal $V_{drive}$ is taken at a point 708 on a first side of the resistor 706 and at a point 710 on a second side of the resistor 706. The voltage level signal taken at point 708 and the voltage level signal taken at point 710 enable the voltage across resistor 706 to be determined by the CPU 718. These voltage readings from each side of resistor 706 are applied to the inputs of a multiplexer 712. The multiplexer 712 multiplexes each of the voltage signal measurements taken at points 708 and 710 onto a single output line 714 that is applied to the input of an analog to digital converter 716. The analog to digital converter 716 converts the analog voltage measurements taken at point 708 and point 710 to digital signals. The digital signals are input to a central processing unit (CPU) 718. The CPU 718 utilizes the voltage readings from point 708 and point 710 to determine the voltage across the resistor 706. The CPU 718 next uses the voltage across the resistor 706 and the resistance value of resistor 706 to determine the load current being applied to the electric motor 704. Alternative methods may be used to determine the load current of the motor such as a current sensor that provides its output to the CPU 718.

The load current calculations are stored within a memory 720 and indexed with various other factors that may affect the load current such as the age of the electric motor 704, outside temperature conditions, outside humidity conditions or any other of a variety of external factors which may affect the load current applied to the electric motor 704. Utilizing the determined load current, the CPU 718 also accesses previously stored load current data from the memory 720 to determine the offset from the normal operating level associated with present operating conditions of the power window assembly. With respect to the appropriate offset, the CPU 718 determines if the present load current exceeds the established load current offset. Also, an output signal is transmitted to the electric motor 704 through a digital input output interface 722 which disables the motor 704 and causes it to stop and reverse direction of the powered window. In this manner, the CPU 718 may intelligently make decisions based upon the variance of the normal load current level 306 and apply the appropriate load current offset based upon current electric motor operating conditions.

The LIN bus pin 726 may be used for linking various CPU units 718 together to enable information to be shared amongst CPUs 718 or relevant control information to be transmitted between CPUs 718. The LIN bus is an asynchronous, pseudo communications interface intended to be used primarily in low cost automotive networks. The LIN interface enables selectable master and slave modes between the CPUs 718. Additionally, the LIN interface enables unique self synchronization without a quartz crystal or ceramic resonator in both master and slave modes. The LIN interface has fully configurable transmission/reception characteristics via the SFRs (Special Function Registers.) Other network interfaces such as UART, LIN, RS-232, etc. may also be used.

Figure 8:
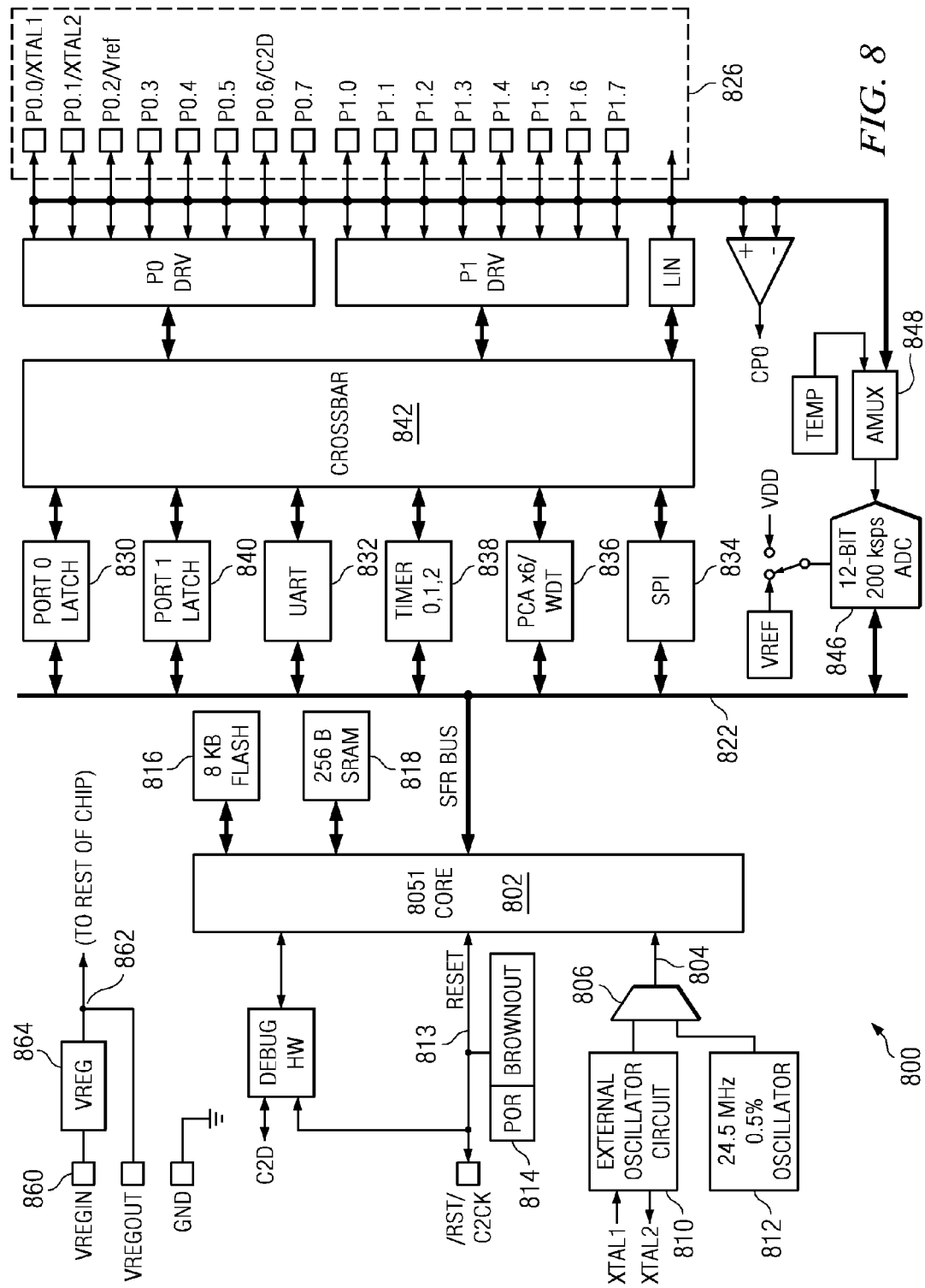
FIG. 8 is a functional block diagram of the microcontroller unit which may be used to implement the design of FIG. 7.

Referring now to FIG. 8, there is illustrated one example of a microcontroller unit 800 which may be used to perform the functions associated with the CPU 718, memory 720, ADC 716 and multiplexer 712. The MCU 800 is generally of the type similar to part number C8051F330 manufactured by Silicon Laboratories Inc. The MCU 800 includes in the center thereof a processing core 802 which is typically comprised of a conventional microprocessor of the type "8051." The processing core 802 receives a clock signal on a line 804 from a multiplexer 806. The multiplexer 806 is operable to select among multiple clocks. There is provided a 24.5 MHz trimmable internal precision oscillator 812 or an external crystal controlled oscillator 810. The precision internal oscillator 812 is described in U.S. patent application Ser. No. 10/244,344, entitled "PRECISION OSCILLATOR FOR AN ASYNCHRONOUS TRANSMISSION SYSTEM," filed Sep. 16, 2002, which is incorporated herein by reference. The processing core 802 is also operable to receive an external reset on terminal 813 or is operable to receive the reset signal from a power-on-reset block 814, all of which provide a reset to processing core 802. The processing core 802 has associated therewith a plurality of memory resources, those being either flash memory 816 or SRAM memory 818. The processing core 802 interfaces with various digital circuitry through an on-board digital bus 822 which allows the processing core 802 to interface with various operating pins 826 that can interface external to the chip to receive digital values, output digital values, receive analog values or output analog values.

Various digital I/O circuitry are provided, these being latch circuitry 830, serial port interface circuitry, such as a UART 832, an SPI circuit 834 or an SMBus PCA/WDT circuit 836. Three timers 838 are provided in addition to another latch circuit 840. All of this circuitry 830-840 is interfacable to the output pins 826 through a crossbar device 842, which is operable to configurably interface these devices with select ones of the outputs. The digital input/outputs can also be interfaced to the digital output of an analog-to-digital converter 846 that receives analog input signals from an analog multiplexer 848 interfaced to a plurality of the input pins 826 on the integrated circuit. The analog multiplexer 848 allows for multiple outputs to be sensed through the pins 826 such that the ADC can be interfaced to various sensors. Again, the MCU 800 is a conventional circuit. The power to the integrated circuit is provided to a terminal 860, which is normally input through an on-chip regulator 864 to a node 862 to provide power to the rest of the chip.

Figure 9:
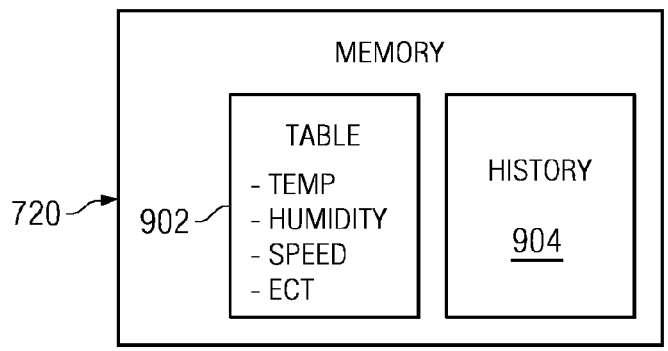
FIG. 9 illustrates the table and history of the window operations stored within the memory of the microcontroller.

Referring now to FIG. 9, there is provided a more detailed illustration of the information which may be stored within the memory 720 which may be utilized by the CPU 718 to provide determinations as to the present value of the normal operation level 306 and the offset that is associated with the threshold for initiating the anti-pinch circuitry. The memory 720 may include a table 902 including information on various load current levels at particular temperatures, at particular humidities and at particular motor speeds and for a variety of other external parameters. The table 902 cross indexes these various parameters with particular load currents such that an appropriate determination may be made with respect to the present normal operation level 306. Once the normal operation level 306 is determined, the appropriate load current offset level with respect to the determined operating level may be determined. Additionally, the memory 720 may include a history 904 containing the operational history of the load current according to the various parameters from for the entire history of the car or over a selected period of time such as the last one year, the last six months, the last month, etc. Once the data within the history memory 904 reaches its expiration period, the oldest data is replaced within the memory by newly created data as it becomes available.

Figure 10:
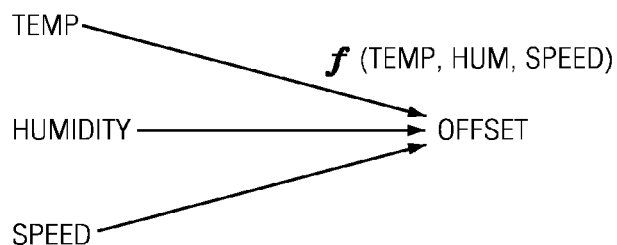
FIG. 10 illustrates the manner in which various factors may be utilized to determine a threshold offset for the anti-pinch control for the window.

Referring now to FIG. 10, there is again illustrated the manner in which the load current offset may be determined as a function of temperature, humidity and speed of the electric motor. While the present description has described the offset being a function of those three parameters, it should of course be realized that any number of different parameters may be utilized to determine the offset or alternatively may be used to determine the normal operation level 306.

Figure 11:
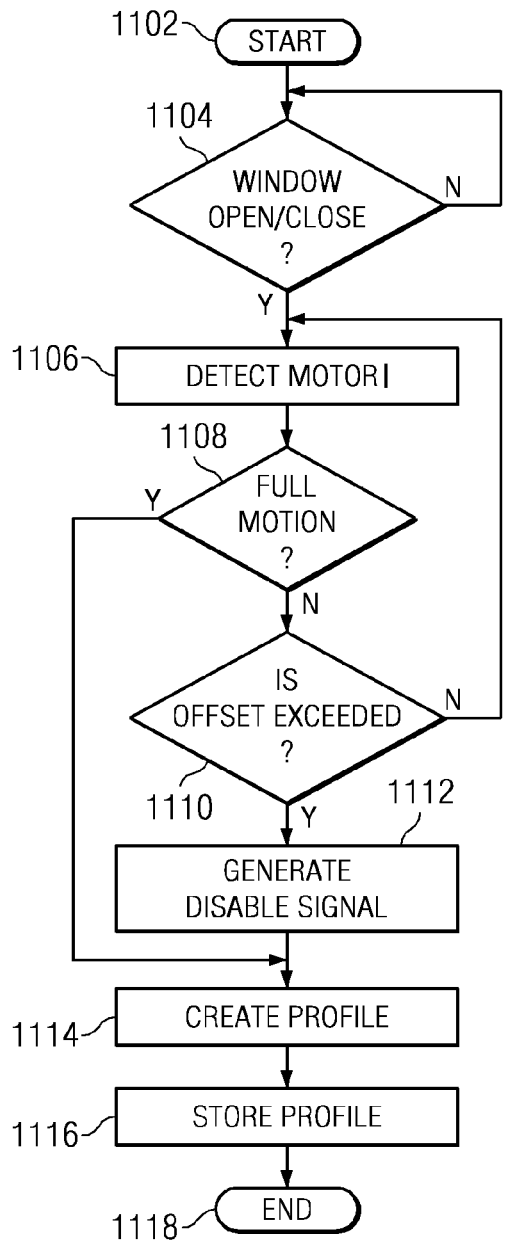
FIG. 11 is a flow diagram illustrating the manner in which a profile may be generated for a particular window.

Referring now to FIG. 11, there is illustrated the manner in which the CPU 718 controls the operation of the anti-pinch circuitry for the powered window assembly. The process is initiated in step 1102 by a driver or passenger in the automobile actuating the powered window assembly. Inquiry step 1104 makes a determination as to whether the window has completed closing. If not, the motor load current is detected at step 1106. Inquiry step 1108 determines if the window has moved its full motion and closed. If inquiry step 1108 determines that the window has not moved its full motion, inquiry step 1110 determines if the motor load current has exceeded the threshold offset established for that window. If not, control passes back to step 1106 wherein the motor load current is again detected. If the load current has exceeded the offset, the CPU generates the disable signal to disable the electric motor at step 1118 since something is apparently pinched within the window and car frame. Once the disable signal has been generated at step 1112 or if inquiry step 1108 determines that the window has moved its full motion, a profile with respect to this opening of the window is created at step 1114. This profile will include information such as present operating conditions for the powered motor assembly, the present temperature, the present humidity and any other factors which have sensors associated with the powered window assembly. The created profile is stored within the tables described previously within the memory of the CPU at step 116. This stored profile information may be used in the future in, for example, step 1110, when determining if the load current offset has been exceeded. The offset may vary in this step based upon the information gathered previously from other window closings. Once the profile has been stored at step 1116, the process is ended at step 1118. The same process would also be applicable to a situation where a window was being opened and became obstructed or jammed in some manner.

Figure 12:
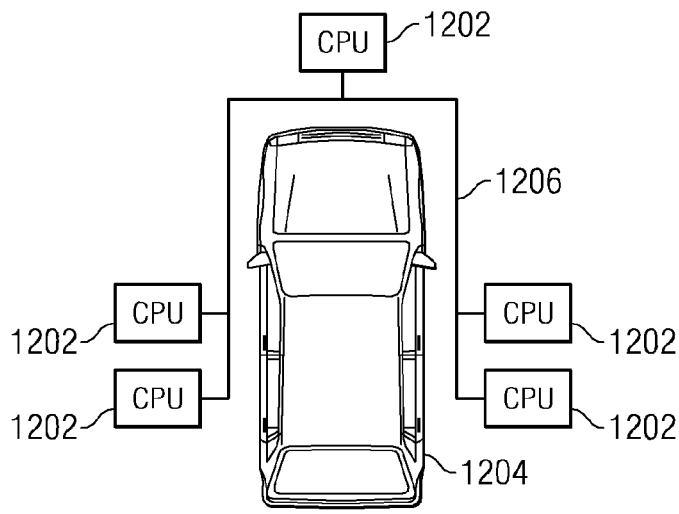
FIG. 12 illustrates the manner in which multiple central processing units may be linked together to control a number of windows within an automobile.

Referring now to FIG. 12, there is illustrated the manner in which a number of CPUs 1202 may be interfaced together within an automobile 1204 via the LIN bus 1206 or some other networked bus. In this manner, each of the CPUs 1202 could share information related to the anti-pinch control system for the powered window assemblies, and each CPU 1202 could be associated with a particular window in the car and independently controlled from all of the other powered window assemblies within the automobile 1204.

It will be appreciated by those skilled in the art having the benefit of this disclosure that this invention provides an improved anti-pinch control system. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An anti-pinch powered window system, comprising:
   a window;
   a mechanical drive mechanism for raising and lowering the window;
   an electric motor for driving the mechanical drive mechanism responsive to a command to change direction of the window;
   a microcontroller unit for determining a normal load current level and a load current offset for use across an entire closing range of the window and generating the command responsive to a measured load current of the electric motor, wherein the command to change direction of the window is generated responsive to a determination that the measured load current has exceeded normal load level plus the load current offset, the load current offset determined based upon at least one of temperature, humidity or motor speed of the electric motor, the load current offset determined by the microcontroller unit from a plurality of load current offsets indexed according to the at least one of temperature, humidity or motor speed of the electric motor; and
   a memory for storing the plurality of load current offsets indexed according to at least one of temperature, humidity or motor speed of the electric motor.

2. The anti-pinch window system of claim 1, further including a resistor placed in series with the electric motor, wherein the microcontroller measures a first voltage on a first side of the resistor and a second voltage on a second side of the resistor.

3. The anti-pinch window system of claim 2, wherein the microcontroller unit determines the load current responsive to the first voltage, the second voltage and a resistance value of the resistor.

4. The anti-pinch window system of claim 2, further including:
   an analog to digital converter for converting the first measured voltage and the second measured voltage into digital signals; and
   a multiplexer connected to receive the first measured voltage and the second measured voltage and individually multiplexing the first measured voltage and the second measured voltage to the analog to digital converter.

5. The anti-pinch window system of claim 1, wherein the microcontroller unit further includes an internal bus connection for interconnecting the microcontroller unit with other microcontroller units via an internal bus.

6. The anti-pinch window system of claim 1, wherein the memory further stores a history of measured load currents for the electric motor to enable determination of the load current offset.

7. The anti-pinch window system of claim 6, wherein the microcontroller further selects the selected threshold level based on the history of measured load currents.

8. An anti-pinch powered window system, comprising:
   a window;
   a mechanical drive mechanism for raising and lowering the window;
   an electric motor for driving the mechanical drive mechanism responsive to a command;
   a microcontroller unit for determining a normal load level and al load current offset for use across an entire closing range of the window and generating the command responsive to a measured load current of the electric motor, wherein the command to change direction of the window is generated responsive to a determination that the measured load current has exceeded the normal load level plus the load current offset, the load current offset determined based upon at least one of temperature, humidity or motor speed of the electric motor, the load current offset determined by the microcontroller unit from a plurality of load current offsets indexed with the at least one of temperature, humidity or motor speed of the electric motor and a history of measured load currents for the electric motor; and
   a memory for storing a table stored in the memory for storing the history of the measured load currents measured for the electric motor and the plurality of load current offsets indexed with the at least one of temperature, humidity and motor speed of the electric motor.

9. The anti-pinch window system of claim 8, further including a resistor placed in series with the electric motor.

10. The anti-pinch window system of claim 8, further including:
   an analog to digital converter for converting the first measured voltage and the second measured voltage into digital signals; and
   a multiplexer connected to receive the first measured voltage and the second measured voltage and individually multiplexing the first measured voltage and the second measured voltage to the analog to digital converter.

11. The anti-pinch window system of claim 9, wherein the microcontroller unit further includes an internal bus connection for interconnecting the microcontroller unit with other microcontroller units via an internal bus.

12. A method for operating an anti-pinch powered window system, comprising the steps of:
    detecting a load current for an electric motor closing a window;
    monitoring at least one of temperature, humidity and motor speed relating to the anti-pinch window system;
    selecting a load current offset for use across an entire closing range of the window from a stored plurality of load current offsets indexed with the at least one of temperature, humidity and motor speed of the electric motor responsive to the at least one of temperature, humidity and motor speed of the electric motor;
    determining if the load current exceeds a normal load current level plus the load current offset; and
    generating a control signal to stop the window if the load current exceeds the normal load current level plus the load current offset.

13. The method of claim 12, wherein the step of detecting farther includes the steps of:
    measuring a first voltage on a first side of a resistor connected in series with the electric motor; and
    measuring a second voltage on a second side of the resistor connected in series with the electric motor.

14. The method of claim 13, farther including the step of storing a plurality of measured load currents, each of the plurality of load currents associated with at least one of the plurality of monitored parameters.

15. The method of claim 12, wherein the step of determining further comprises the step of calculating the load current responsive to the first voltage, the second voltage and a resistance value of the resistor.

16. The method of claim 15, further including the steps of:
    multiplexing the first measured voltage and the second measured voltage to an analog to digital converter; and
    converting the first measured voltage and the second measured voltage into digital signals.

17. The method of claim 12, wherein the step of selecting the load current offset further comprises the step of:
    storing a history of measured load currents for the electric motor; and
    selecting the load current offset level responsive to the history of the measured load currents.

* * * * *